US008725828B2

(12) United States Patent
Sathish et al.

(10) Patent No.: US 8,725,828 B2
(45) Date of Patent: May 13, 2014

(54) METHOD, APPARATUS, AND COMPUTER PROGRAM PRODUCT FOR RECOMMENDING INTERACTION BETWEEN DEVICES IN A LOCAL ENVIRONMENT

(75) Inventors: Sailesh Sathish, Tampere (FI); Jari Hamalainen, Kangasala AS (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/186,011

(22) Filed: Jul. 19, 2011

(65) Prior Publication Data

US 2013/0024508 A1 Jan. 24, 2013

(51) Int. Cl.
*G06F 15/167* (2006.01)

(52) U.S. Cl.
USPC .......................................... 709/216

(58) Field of Classification Search
USPC .......................................... 709/216
See application file for complete search history.

(56) References Cited

U.S. PATENT DOCUMENTS

| | | | |
|---|---|---|---|
| 6,549,768 B1 | 4/2003 | Fraccaroli | |
| 7,280,822 B2 | 10/2007 | Fraccaroli | |
| 7,640,502 B2 * | 12/2009 | Xu et al. | 715/730 |
| 7,788,188 B2 | 8/2010 | Kramer | |
| 7,856,360 B2 | 12/2010 | Kramer et al. | |
| 7,970,390 B2 | 6/2011 | Fraccaroli | |
| 8,027,678 B2 * | 9/2011 | Tysowski et al. | 455/435.2 |
| 8,032,126 B2 | 10/2011 | Fraccaroli | |
| 8,238,950 B2 * | 8/2012 | Simon et al. | 455/466 |
| 2003/0055867 A1 * | 3/2003 | King | 709/201 |
| 2006/0126812 A1 * | 6/2006 | Carlson et al. | 379/156 |
| 2010/0010944 A1 * | 1/2010 | Cheng et al. | 706/12 |
| 2010/0031299 A1 | 2/2010 | Harrang et al. | |
| 2010/0205628 A1 | 8/2010 | Davis et al. | |
| 2010/0217660 A1 * | 8/2010 | Biswas | 705/14.38 |
| 2010/0222102 A1 | 9/2010 | Rodriguez | |
| 2011/0162018 A1 | 6/2011 | Dodd | |
| 2011/0185437 A1 * | 7/2011 | Tran et al. | 726/28 |
| 2011/0283190 A1 * | 11/2011 | Poltorak | 715/716 |
| 2012/0172025 A1 | 7/2012 | Hamalainen et al. | |
| 2012/0278268 A1 | 11/2012 | Hamalainen et al. | |
| 2012/0330777 A1 | 12/2012 | Sathish et al. | |

FOREIGN PATENT DOCUMENTS

| | | |
|---|---|---|
| WO | WO 2005/119463 A2 | 12/2005 |
| WO | WO 2011/049497 A1 | 4/2011 |

OTHER PUBLICATIONS

Ahtinen, Aino, et al. "Small Things Matter, The User Evaluation with Wellness Diary Application." *Ubicomp 2007 workshop Proc.* 2007.
International Search Report and Written Opinion from International Application No. PCT/FI2012/050731, mailed Oct. 25, 2012.

(Continued)

*Primary Examiner* — Alicia Baturay
(74) *Attorney, Agent, or Firm* — Alston & Bird LLP

(57) ABSTRACT

Various methods are provided for recommending interaction between devices in a local environment. One example method may include locating at least one device within a local environment in response to an interaction with content. The at least one device that is located within a local environment is configured to provide functionality related to the interaction with the content. The method may include identifying a selected device from the located at least one device based on a user profile recommendation and the interaction with the content. The method may further include causing at least one of the content and an executable to be transferred to the identified selected device. Similar and related example apparatuses and example computer program products are also provided.

20 Claims, 5 Drawing Sheets

(56) References Cited

OTHER PUBLICATIONS

Holleis, Paul, et al,; "Studying Applications for Touch-Enabled Mobile Phone Keypads"; Proceedings of the Second International Conference on Tangible and Embedded Interaction (TEI'08), Feb. 18-20, 2008, Bonn, Germany; pp. 15-18.

Ahtinen, Aino, et al.; "Developing a Mobile Reporting System for Road Maintenance User Research Perspective"; Proc. Of the 4$^{th}$ Intl. Conf. on Mobile Technology, Applications and Systems (Mobiltity 2007); pp. 1-7.

Dey, Anind K., et al.; "Chapter XIII Context-Awareness and Mobile Devices"; Context-Awarenes and Moblie Devices; Copyright 2008; pp. 205-217.

Balandin, Sergey, et al.; "Multimedia Services on Top of M3 Smart Spaces"; IEEE Region 8 SIBIRCON-2010, Irkutsk Listvyanka, Russia, Jul. 11-15, 2010; pp. 728-732.

DLNA, Connect and Enjoy—Consumer Home; Downloaded from http://www.dlna.org/ on Dec. 6 2012; 1 page.

The XMPP Standards Foundation; Downloaded from http://xmpp.org/ on Nov. 15, 2012; 6 pages.

Recommender System—Wikipedia, the free encyclopedia; Downloaded from http://en.wikipedia.org/wiki/Recommendation_systems, on Nov. 15, 2012; 6 pages.

Geolocation API Specification; Downloaded from http://dev.w3.org/geo/api/spec-source.html, on Nov. 15, 2012; pp. 1-19.

Session Initiation Protocol—Wikipedia, the free encyclopedia; Downloaded from http://en.wikipedia.org/wiki/Session_Initiation_Protocol, on Nov. 15, 2012; pp. 1-10.

Sathish, Sailesh; "Using Declarative Models in Multi-Device Smart Space Environments"; Copyright 2005 Nokia; pp. 1-9.

Sofia; M3 Smart Space Infrastructure; Smart Objects for Intelligent Application; Nokia; Downloaded from http://image.slidesharecdn.com/juhapekkasoininenm3smartspaceinfrastr. . ..; Downloaded on Nov. 15, 2012; pp. 1-20.

Haveri, M. et al., "mCell: Platform Independent Communication for Small Groups" 9$^{th}$ Intl. Conf. on Human Computer Interaction with Mobile Devices and Services (MobileHCI'07); (Sep. 10, 2007) pp. 206-213.

Paasovaara, S. et al., "Charting User Expectations on Mobile Shopping—Role—Playing Study on Mobile Interaction with RFID Technology"; (May 19, 2008) pp. 1-4.

\* cited by examiner

METHOD, APPARATUS, AND COMPUTER PROGRAM PRODUCT FOR RECOMMENDING INTERACTION BETWEEN DEVICES IN A LOCAL ENVIRONMENT

TECHNICAL FIELD

Various embodiments relate generally to techniques for recommending interactions between devices, and, more particularly, relate to a method, apparatus, and computer program product for recommending interaction between multiple devices to improve user experience.

BACKGROUND

The modern communications era has brought about a tremendous expansion of wireline and wireless networks. Computer networks, television networks, and telephony networks are experiencing an unprecedented technological expansion fueled by consumer demand. Wireless and mobile networking technologies have addressed needs related consumer demands, while providing more flexibility and immediacy of information transfer.

Current and future networking technologies continue to facilitate ease of information transfer and convenience to users. One area in which there is a demand to increase ease of information transfer relates to the use of services by a user of a mobile terminal. These services may be in the form of particular media or communication services desired by the user, such as a music player, a game player, an electronic book, short messages, email, content sharing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

Further, the user experience for interacting with these services may be programmed for the device during manufacturing. The user may have an opportunity to personalize the user experience by changing settings (e.g. defining personalized ringing/alert tone, ringing volume for each profile) or by selecting the applications (e.g. widgets) that are visible in the home screen of the device or by downloading new applications to the device. However, this personalization requires manual effort to make the device to behave and look the way the user wants. Usage tips and rules for presenting the tips may be programmed for the device (e.g., mobile phone) during manufacturing. Some tips are sent to device through a network (using e.g. text messages) thus offering the possibility to present tips that are not programmed to the device during manufacturing.

SUMMARY

Example methods, example apparatuses, and example computer program products are described herein that provide for recommending interaction between devices and between services and applications in a local environment. As such, the user experience may be improved by permitting collaboration of the devices in a manner consistent with user preferences, but without requiring substantial user effort.

One example method may include locating at least one device within a local environment in response to interaction with content. The at least one device that is located within a local environment is configured to provide functionality related to the interaction with the content. The method may include identifying a selected device from the located at least one device based on a user profile recommendation and the interaction with the content. The method may further include causing at least one of an executable and/or content to be transferred to the identified selected device.

Another example method may include causing one or more services and/or devices to be discovered within a local environment. The method may further include, in response to a selection and/or interaction with the one or more services and/or devices, storing the selection and/or interaction for use in future device selection, one or more services, and/or additional session parameters within the local environment.

An additional example embodiment is an apparatus configured to recommend interaction between devices and between services and applications in a local environment. The example apparatus may comprise at least one processor and at least one memory including computer program code with the at least one memory and the computer program code configured to, with the at least one processor, direct the apparatus to perform various functionality. In this regard, the example apparatus may be directed to cause a plurality of local devices to be discovered in response to a user interaction with an executable. In this example, the plurality of local devices are configured to provide functionality related to the user interaction with the executable. The example apparatus may further select a local device out of the discovered plurality of local devices based on a user profile and the user interaction with the executable. The example apparatus may then cause at least a portion of the functionality related to the executable to be transferred to the selected local device Another example embodiment is a computer program that, when executed causes an apparatus to receive a listing of available devices in response to a user interaction with an executable. The available devices are configured to provide functionality related to the user interaction with the executable. A local device is selected from the received listing of available devices based on a user profile and the user interaction with the executable. At least a portion of the functionality related to the executable is caused to be transmitted to the selected local device.

BRIEF DESCRIPTION OF THE DRAWINGS

Figure 1:
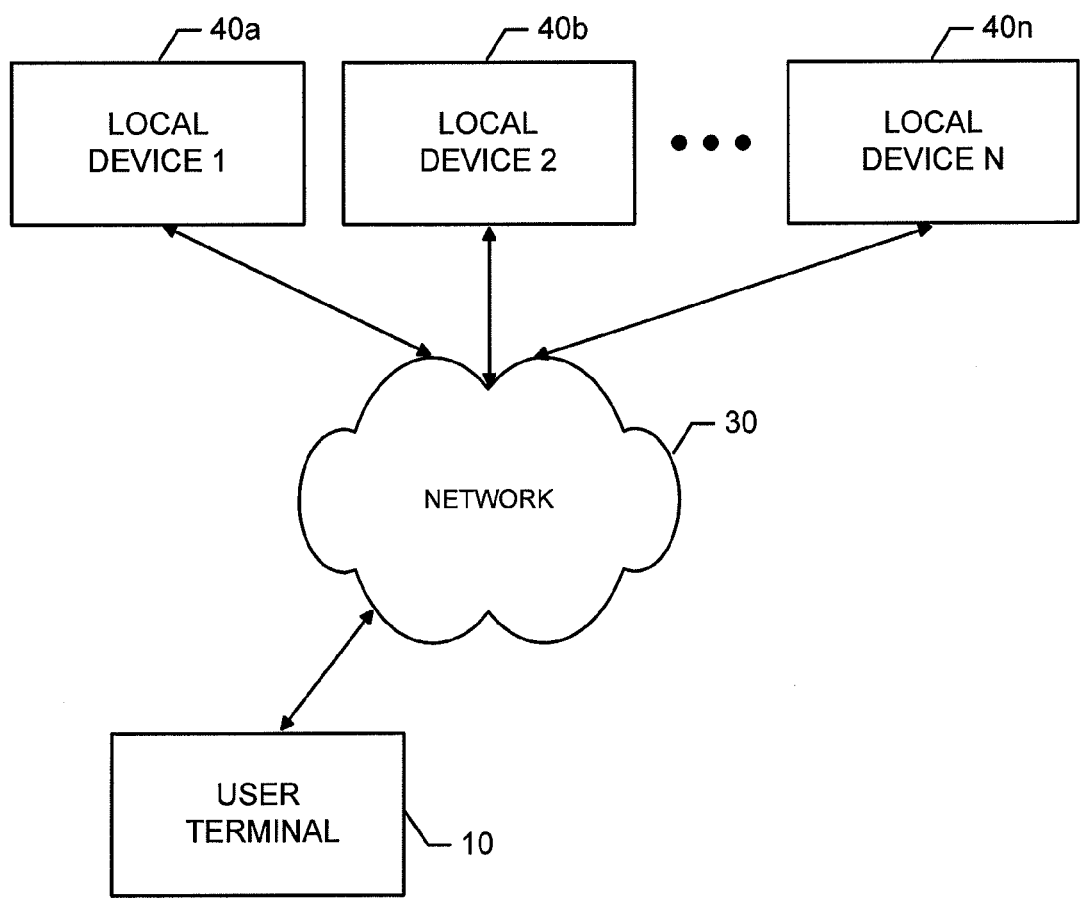
Figure 2:
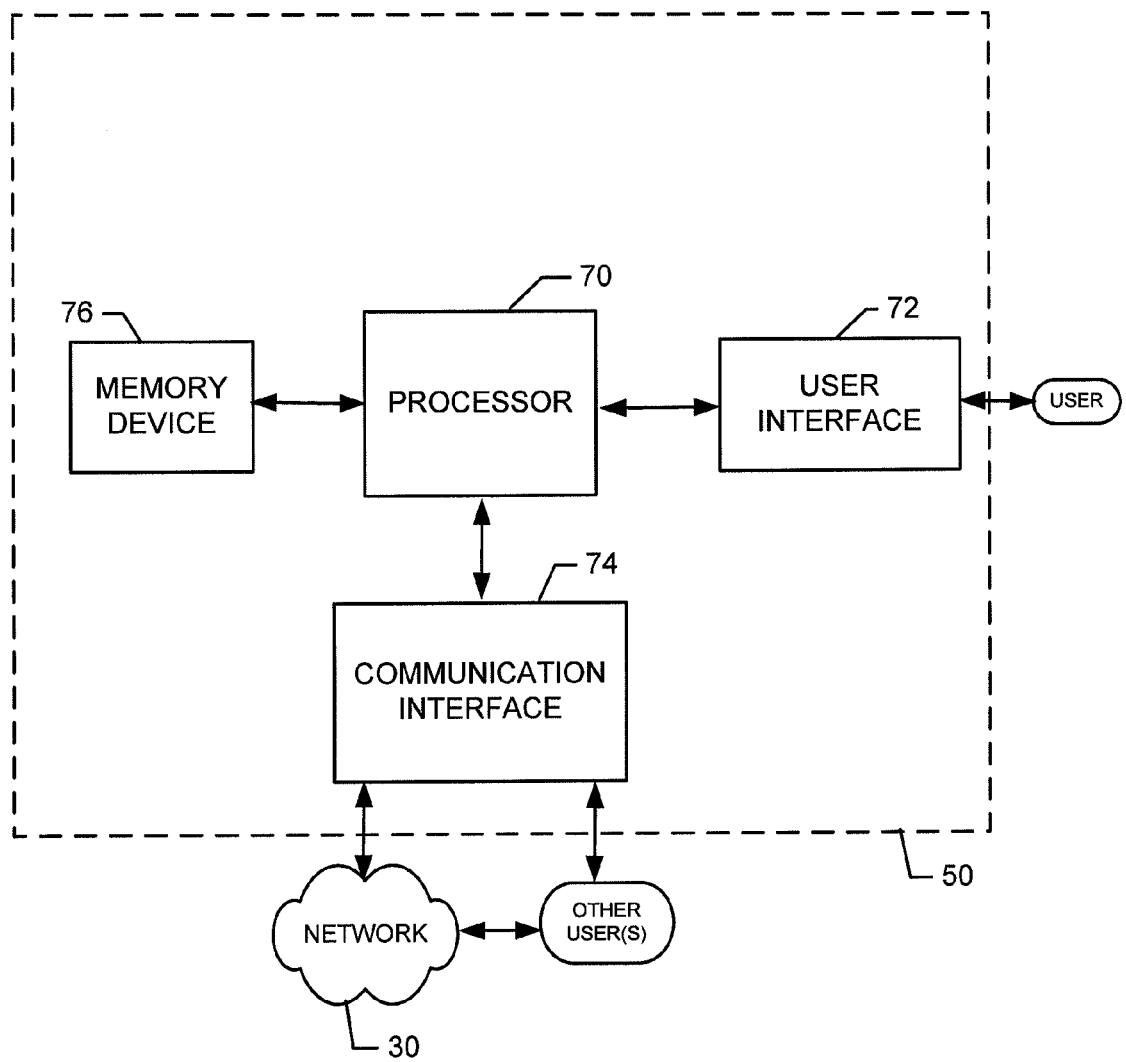
Figure 3:
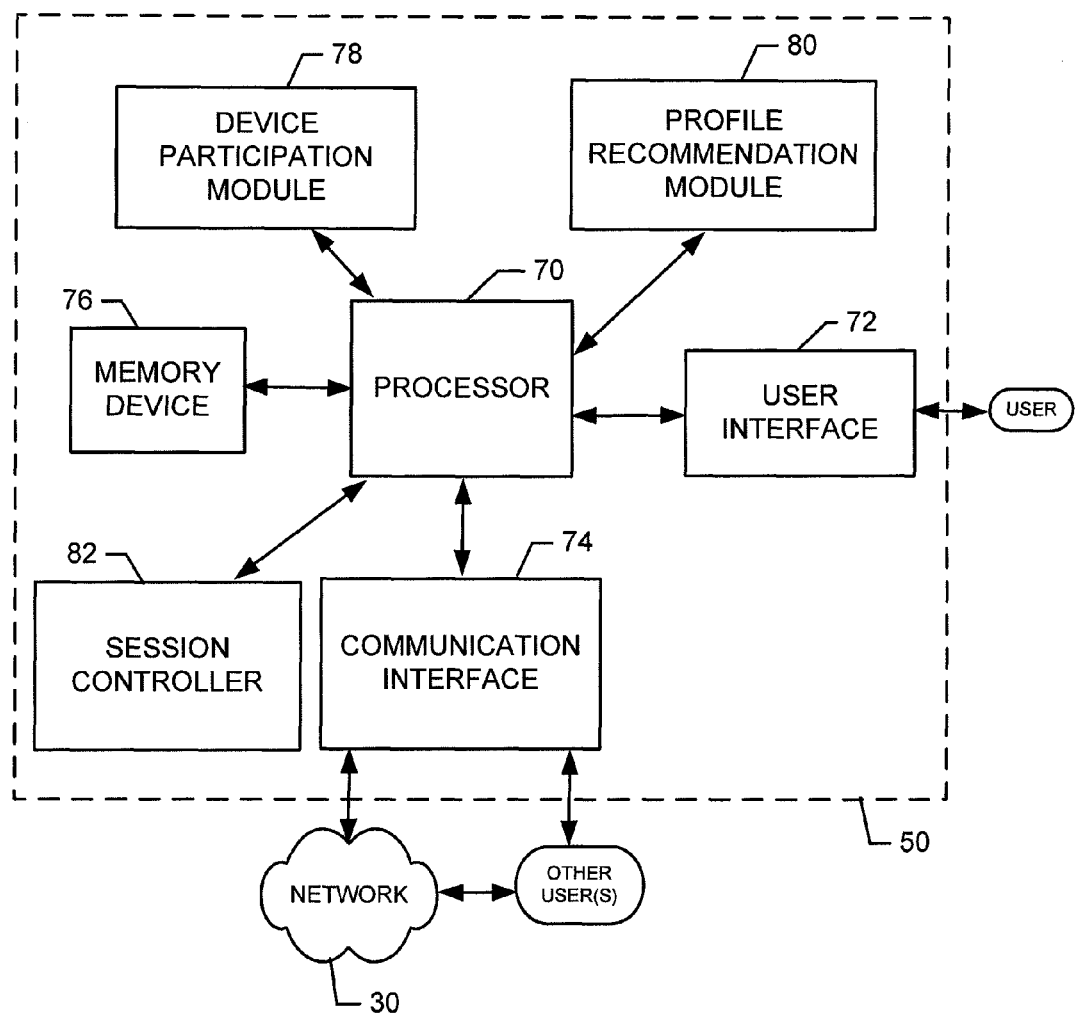
Figure 4:
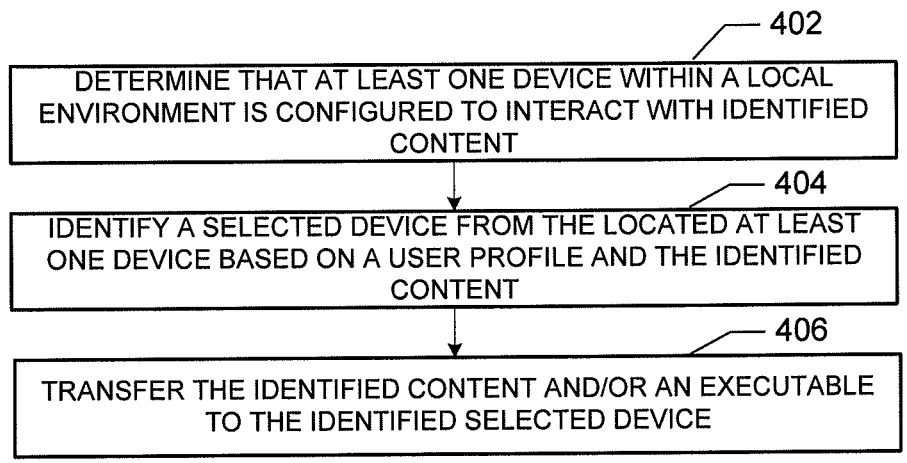
Figure 5:
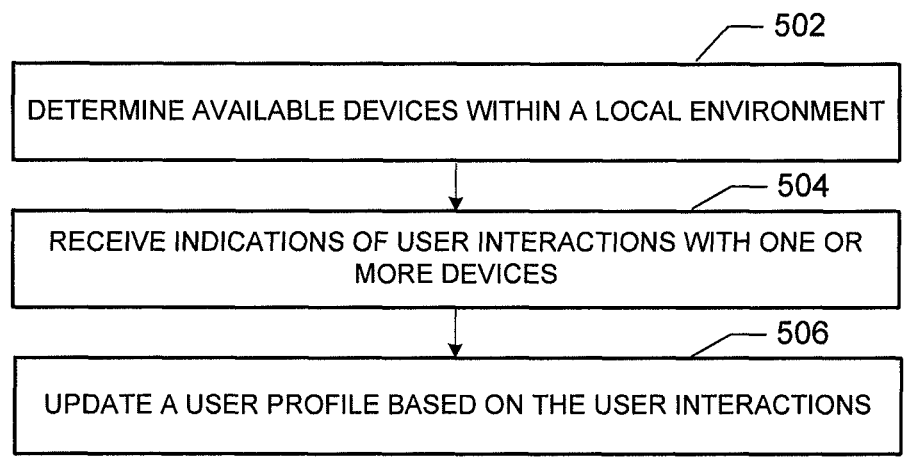

Having thus described some example embodiments in general terms, reference will now be made to the accompanying drawings, which are not necessarily drawn to scale, and wherein:

FIG. 1 illustrates a schematic block diagram of a system according to an example embodiment of the present invention;

FIG. 2 illustrates a schematic block diagram of an apparatus configured to recommend interaction between devices in a local environment according to an example embodiment of the present invention;

FIG. 3 illustrates a schematic block diagram of an embodiment of the apparatus of FIG. 2 including additional components configured to recommend interaction between devices in a local environment based on available devices and a user profile according to an example embodiment of the present invention;

FIG. 4 illustrates a flowchart of the operations performed in recommending interaction between devices in a local environment based on available devices and a user profile according to an example embodiment of the present invention; and FIG. 5 illustrates a flowchart of the operations performed in developing a user profile according to an example embodiment of the present invention.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor (s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

Various example embodiments operate to provide interactivity between devices within a local environment. As such, some example embodiments may be implemented on any device configured to display and/or interact with content, including mobile devices, computing devices, displays and/or the like. For example, such a device may be a mobile phone that is configured to display a motion picture and another such device may be a television that is connected directly or indirectly to a network. However, the devices may include devices that are fixed or relatively fixed, such as personal computers, televisions, gaming systems, computer workstations or the like.

According to various example embodiments, multiple devices located within an environment may interact to provide a user with an enhanced experience. For example, a user may have an improved experience if a video clip currently showing on a mobile device is transferred automatically to a television screen. A user may also enjoy an improved experience when an electronic mail message that the user is composing is transferred from a mobile device to a device with a QWERTY keyboard once the electronic mail message response exceeds a certain length. Both examples are supported by an environment where devices work together to automatically provide the user with an enhanced experience.

To provide such an enhanced user experience, example embodiments may locate devices within a local environment that are configured to operate an executable (e.g. an application, a service, a program or other code and/or the like) that is currently executing on a device. The available list of determined devices within the local environment is then filtered based on the executable requirement. The executable whose type is provided and which can be determined from an externally provided description such as ontology is used to determine the set of functions that can assist or enhance current user experience. This list is further enhanced with user preference information provided by a recommendation profile for the user. One or more devices are then selected from a set of devices that are currently hosting executables capable of providing those functionalities. A device or plurality of devices may then transfer a portion (which may include only a subset or all) of the functionality of the executable (e.g. processing responsibility, content storage and/or provisioning, user interface display and/or the like) from the initial or current device to one or more of the located devices within the local environment, such as in an instance in which it is determined that the user experience would be enhanced by such a transfer. After such a transfer, the executable may be executing fully or partially on another device.

To determine the device and or devices that may cooperate to provide the functionality required by the executable, in example embodiments, a user's behavior may be tracked in order to build a profile as the user interacts with one or more devices. For example, the user may interact with the majority of electronic mail messages on a home computer, and in turn may listen to a majority of audio files over a home stereo system. Such behavior may suggest that when in proximity of one of those devices, the user may want that type of action (e.g., email response and/or audio) to be transferred to the respective one of the devices that the user has generally utilized in the past for similar actions. Such a profile may also provide the user with privacy options to ensure particular content remains private.

FIG. 1 illustrates a generic system diagram in which a device, such as a user terminal 10, is shown in an exemplary communication environment. As shown in FIG. 1, an embodiment of a system in accordance with an example embodiment of the present invention may include a first communication device (e.g., user terminal 10) capable of communication with other devices (e.g., local device A 40a, local device B 40b, and local device N, 40n) via a network 30. In some cases, embodiments of the present invention may further include one or more additional communication devices. Conversely, in some embodiments, not all systems that employ embodiments of the present invention may comprise all the devices illustrated and/or described herein. In an exemplary embodiment, the user terminal 10 and/or the local devices 40a-n may be examples of terminals, such as portable digital assistants (PDAs), pagers, mobile televisions, mobile telephones, gaming devices, laptop computers, cameras, video recorders, audio/video players, radios, global positioning system (GPS) devices, or any combination of the aforementioned, and other types of voice and text communications devices. However, other devices may also employ embodiments of the present invention. Furthermore, fixed devices, such as servers, televisions or other displays, set top boxes, gaming systems, and personal computers may also readily employ embodiments of the present invention.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), and/or the like. In some embodiments, the network 30 may be a P2P (peer-to-peer) network, a wireless local area network (WLAN) or other proximity-based network including an adhoc network.

One or more communication terminals such as the user terminal 10 and the local devices 40a-n may be in communication with each other, such as via the network 30 or via direct communications links, such as provided by Bluetooth, machine-to-machine communication or the like. Each communication terminal may include an antenna or antennas for transmitting signals to and for receiving signals, such as to and from another device or a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the user terminal 10 and/or the local devices 40a-n via the network 30. By directly or indirectly connecting the user terminal 10 and the local devices 40a-n (and/or other devices), such as via the network 30, the user terminal 10 and the local devices 40a-n may be enabled to communicate with the other devices or each other, for example, according to numerous communication protocols including Hypertext Transfer Protocol (HTTP) and/or the like, to thereby carry out various communication or other functions of the user terminal 10 and local devices 40a-n, respectively.

Furthermore, although not shown in FIG. 1, the user terminal 10 and devices, such as the local devices 40a-n, may communicate in accordance with, for example, radio frequency (RF), Bluetooth (BT), Infrared (IR) or any of a number of different wireline or wireless communication techniques, including LAN, Wireless LAN (WLAN), Worldwide Interoperability for Microwave Access (WiMAX), WiFi, Ultra-Wide Band (UWB), Wibree techniques and/or the like. As such, the user terminal 10 and the local devices 40a-n may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an exemplary embodiment, the network 30 may be an ad hoc or distributed network arranged to define a smart space (e.g., environment). Thus, devices may enter and/or leave the network 30 and the devices of the network 30 may be capable of adjusting operations based on the entrance and/or exit of other devices to account for the addition or subtraction of respective devices or nodes and their corresponding capabilities. In an example embodiment, one or more of the devices in communication with the network 30 may employ a context model to assist in providing an interface between applications and data providers. As such, for example, a consumer application may request information from a data provider within the network 30 and any one of the user terminal 10 or the local devices 40a-n may host the consumer application while any other one of the user terminal 10 or the local devices 40a-n (or some other network device) acts as a provider with respect to the consumer application to provide information such as semantic and/or context information to the respective consumer application. The context model may therefore define a representation for various ones of objects, documents, web pages or other data represented in the model.

In an example embodiment, a user interacts with an executable that may require certain functionality such as content creation or retrieval, execution of various processes, display or other interaction with a user interface and/or the like from the user terminal 10. The user terminal 10 of one embodiment may discover, such as in response to user interaction, a plurality of local devices 40a-n over the network 30 that are configured to provide at least some of the functionality required by the executable that is to be executed by the user terminal 10.

In an example embodiment, a local device of the local devices 40a-n may be selected based on the functionality and/or the services/applications running on the local device that the local device may be configured to provide to the user terminal 10 based on an ontology. The ontology describes the tasks, subtasks, parameters and protocol information needed by the user terminal 10 to perform the requested functionality. In this example, the user terminal 10 may determine what subtasks each of local devices 40a-n can provide and then may determine if any of the local devices 40a-n can provide a higher task based on the subtask. Once a higher level task can be serviced, the local devices 40a-n may then transmit this to the user terminal 10.

In an example embodiment, a local device of the local devices 40a-n may then be selected to provide the functionality for the user interaction based on a stored profile, such as a profile of past or historical user behavior so as to determine the manner in which the user typically desires to interact with the executable, e.g., the stored profile may indicate which of the local devices are typically utilized by the user for input and output operations associated with the executable. In example embodiments, there may be multiple devices that can provide the functionality requested by the user terminal 10, in such situations the user profile may act as secondary information for selecting a particular device from the multiple devices. The stored profile may be stored on the user terminal 10, or may be at a network location (not shown) accessible to the user terminal. In example embodiments, the profile may be compared with the devices supported in the environment to determine a selected device that is identical to or most similar to the device typically utilized by the user to provide a particular functionality required by the executable. In an example embodiment, the user profile may be a latent profile or an explicit profile. A latent profile may be built through methods such as collaborative filtering and an explicit profile may be based on an xml representation. Such profiles allow for the information obtained from the local environment to be used differently based on the recommendation model employed.

The user terminal 10 then may cause some functionality of the executable to be transferred to the selected device of the local devices 40a-n. For example, all or a portion of the content may be transferred or directed to the selected device for processing, display or the like by the selected device. Indeed, in an instance in which the user terminal 10 includes the content, the user terminal may transfer all or a portion of the content to the selected device. Alternatively, in an instance in which the user terminal 10 is to download or otherwise access the content, the user terminal may direct the selected device to, instead, download or otherwise access the content. In some embodiments, the user terminal may cause all of the functionality associated with the executable to be transferred to the selected device, thereby effectively transferring the executable itself to the selected device. Although embodiments of the present invention are discussed in terms of a single selected device, the user terminal 10 of another embodiment may select a plurality of local devices to cooperate with the user terminal in the execution of the executable and, as such, the user terminal of this embodiment may cause the content and/or the executable to be transferred to the plurality of local devices of the local devices 40a-n FIG. 2 illustrates a schematic block diagram of an apparatus configured to recommend interaction between devices in a local environment according to an example embodiment of the present invention. The apparatus 50 of FIG. 2 may be employed, for example, on the user terminal 10 (and/or the local devices 40a-n). Alternatively, the apparatus 50 may be embodied on a network device of the network 30. However, the apparatus 50 may alternatively be embodied at a variety of other devices, both mobile and fixed (such as, for example, any of the devices listed above). In some cases, embodiments may be employed on a combination of devices. Accordingly, some embodiments of the present invention may be embodied wholly at a single device (e.g., the user terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in certain embodiments.

Referring now to FIG. 2, the apparatus 50 may include or otherwise be in communication with a processor 70, a user interface 72, a communication interface 74 and a memory device 76. The memory device 76 may include, for example, volatile and/or non-volatile memory. The memory device 76 may be configured to store the executable and, in some embodiments, content to be utilized or accessed by the executable during its execution. The memory device 76 may also store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 may be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions (such as executables), the instructions may specifically configure the processor 70, which may in some cases otherwise be a general purpose processing element or other functionally configurable circuitry if not for the specific configuration provided by the instructions, to perform the algorithms and/or operations described herein. However, in some cases, the processor 70 may be a processor of a specific device (e.g., a mobile terminal or server) adapted for employing embodiments of the present invention by further configuration of the processor 70 by instructions for performing the algorithms and/or operations described herein.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, remotely located, or eliminated.

FIG. 3 illustrates a schematic block diagram of an embodiment of the apparatus of FIG. 2 including additional components configured to recommend interaction between devices in a local environment based on available devices and a user profile according to an example embodiment of the present invention. As described below, there may be executables, such as applications, running or otherwise being executed within a device such as the user terminal 10. All such executables may have the potential to utilize context data in order to perform adaptive services with respect to the user. In example embodiments, context may be determined by a processor 70 based on information provided various inputs, such as time of day, light sensors, accelerometers or other motion sensors, position data, information from a calendar application or the like.

In an example embodiment, the processor 70 may be embodied by, include or otherwise control the session controller 82. The session controller 82 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the session controller 82 as described below. The software may be stored in the memory of a communication device (e.g., the user terminal 10, the local devices 40*a-n*, and/or a remote device) and executed by the processor 70. Alternatively, the software may form a part of or be installed on middleware, for example, of the communication device. Thus, in examples in which software is employed, a device or circuitry (e.g., the processor 70 in one example) executing the software cooperates with the software to comprise the session controller 82.

In this regard, for example, the session controller 82 may be configured to provide, among other things, the registration of devices within the local environment, such as local devices 40*a-n*. More specifically, the session controller 82 may access the device participation module 78 to discover devices within the local environment, as well as, to determine the functionality of the devices. In example embodiments, the functionality (e.g., functions and/or functional definitions) of devices may be determined based on known characteristics of particular devices and/or generic instructions for a class of devices. In example embodiments, the function(s) of a device may be high level or may be broken down in lower-order sub functions to allow for a distributed session. The session controller 82 may, in conjunction with the device participation module 78, cause the communications interface 74 to broadcast information to devices in the local environment.

In an example embodiment, the session controller 82 defines an ontology based set of device functions. As described herein, functions allow for distribution of content and/or processing to one or more devices, thereby not restricting processing and/or content distribution to individual devices (such as local devices 40*a-n*). Alternatively, or additionally functional ontology definitions are mapable such as Delivery Context Ontology from World Wide Web Consortium (W3C) and are compatible with ontology definitions available in standard bodies. In example embodiments ontologies are combinable and may be defined in an eXtensible markup language (XML) format. However, other formats such as a web ontology language (OWL) may be used.

The session controller 82 may also be configured to provide a plurality of session type options that may define an interaction between the user terminal 10 and the local devices 40*a-n*. In an example embodiment, session type determines priorities between devices for processing distribution, functional distribution, privacy details, connectivity options, content type support and/or the like. Session types may be explicitly provided by one or more participating entities within the session and these may be pre-loaded to the device, such as user terminal 10, during the device manufacturing phase or downloaded later by a user and/or service. If a session type is defined, a particular session type is chosen based on user interaction, a context-type and/or application type. If no session types are defined, a random selection of devices and services can take place or selection may be based on a preference provided within the user profile.

Session types may include but are not limited to invited-entity sessions where content is downloaded by a device (such as local devices 40*a-n*) and then interaction with a device (such as local devices 40*a-n*) is invited. Another example session is a composite capable session, where a current capability is predetermined by the processor 70 prior to user interaction and/or launch of an executable by the session controller 82. Yet another example session type is function seek, where based on the content and/or the executable the session manager 82 may determine, in conjunction with the processor 70, a device (such as local device(s) 40*a-n*) that has a particular function. Yet another example session type includes forced participation which permits a user may force a device (such as local devices 40*a-n*) to take part in a session. Alternatively, or additionally multiple sessions may be running simultaneously.

The session controller 82 of one embodiment is further configured, based on session types, to provide definitions (e.g., rules and instructions) for how a session is executed. For example, the session controller 82 may access a user profile recommendation module 80. In an example embodiment, the processor 70 embodies, includes or otherwise controls the user profile recommendation module 80 which, in turn, is configured to provide recommendations of devices based on a stored user profile. In other words, the user profile may include information such as past behavior, privacy requests, preferences and/or the like. The user profile may be stored locally on the device or may be accessible over a network connection. For example, a privacy request may include a request not to transfer audio to a work computer and/or the like. Other session controller 82 definitions may include, but are not limited to, an order of preference with regard to the distribution of processing and content across one or more devices, management of multiple sessions, and/or the like.

Example embodiments of the profile recommendation module 80 may refer to a user profile schema or ontology. Thereby, the session controller 82 may access the user profile and base the recommendation of local devices at least in part on the user profile schema or ontology, which advantageously provides support for semantic session types by the session controller 82.

In example embodiments, the session controller 82 may also provide definitions for security of data that is transferred between devices. For example, if user information were to be presented or accessible by a public network, the session controller may provide additional security instructions to the device.

In an example embodiment, the processor 70 embodies, includes or otherwise controls the device participation module 78. In example embodiments, the device participation module 78 is configured to analyze the devices available within the environment and to provide identification of those devices to the session controller 82.

In example embodiments, the device participation module 78 is further configured to determine the functionality (e.g., functional definitions) of devices within an environment such as local devices 40*a-n*. For example, the device participation module 78 may locate a television that is connected via network 30. The television, in this example, would be configured to provide a display for images as well as to provide sound. Thus, the example functions of the television would be image and sound. As described above, such functions may be further broken down into sub functions. The device participation module 78 may be further configured to provide the functional definitions as well as to provide a functional hierarchy that may be accessible by the session controller 82.

In example embodiments, the communications interface 74 is configured to transmit invitations to devices in the environment, to send updates, to communicate functional data, distribute content, provide synchronous and asynchronous status updates, communicate polices and/or the like. Such communications may be accomplished using a single communication protocol definition or using a combination of standard protocols. In an example embodiment, the communications framework may additionally support external proxy based content adaptors and unified authoring systems.

FIGS. 4 and 5 are flowcharts of a system, method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by a computer program product including computer program instructions stored in a non-transitory computer-readable storage device. In this regard, the computer program instructions which embody the procedures described above may be stored by a memory device of the mobile terminal or network device and executed by a processor in the user terminal 10 or network device. As will be appreciated, any such computer program instructions may be loaded onto a computer or other programmable apparatus (e.g., hardware) to produce a machine, such that the resulting computer or other programmable apparatus embody means for implementing the functions specified in the flowcharts' blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts' blocks. The computer program instructions may also be loaded onto a computer or other programmable apparatus to cause a series of operations to be performed on the computer or other programmable apparatus to produce a computer-implemented process.

Accordingly, blocks of the flowcharts support combinations of means for performing the specified functions and/or program instructions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, FIG. 4 illustrates a flowchart of the operations performed in recommending interaction between devices in a local environment based on available devices and a user profile according to an example embodiment of the present invention. At block 402, the interaction or intended interaction with identified content of at least one device (e.g., user terminal 10) that is located within a local environment is identified or otherwise determined, such as by the processor 70 of the apparatus 50. For example, the interaction may be the activation of media or may be the activation of an electronic mail program. Once the interaction is determined, the device, such as the processor 70, device participation module 78 or the like, may attempt to locate at least one other device in the environment that is configured to provide functionality related to the user interaction. For example, if activating a video was the user interaction, the device may attempt to locate another device that is configured to display a video.

At block 404, a selected device is identified, such as by the processor 70, the device participation module 78 or the like, from the located at least one device based on a user profile and the identified content. The user profile, as described herein, is a profile that indicates preferences of a user based on past actions, privacy settings and/or system defaults. The profile may be configured to define the user's preference for certain devices based on the user location, time of day, type of content or other functionality that is desired, and/or the like. For example, if activating a video was the user interaction and the user had requested that a video never be played on the family television, the device would be limited such that the family television would not be selected. Alternatively, if the user profile indicated that the user always played videos on a display associated with a personal computer as opposed to a mobile terminal, the personal computer would be selected.

At block 406, the content and/or an executable is transferred to the identified selected device. Based on the functionality of the selected device and the user profile, the apparatus 50, such as the processor 70, session controller 82 or the like, may transfer just the content to the identified selected device for display, storage or the like. In such a case, the user terminal 10 would maintain processing control, but would provide the content to the selected device. For example, a video display may be transferred to the personal computer while the processing of the video may still remain with the user terminal 10. By way of another example, in a computationally intensive application that is running on a thin client, the thin client may retain the content for display, storage or the like, while transferring the processing responsibility to another selected device. In yet another embodiment, the entire executable including both the processing and the content may be transferred to a selected one of the local devices if the user profile dictates such a transfer. The method ends at the conclusion of block 406.

FIG. 5 illustrates a flowchart of the operations performed in developing a user profile according to an example embodiment of the present invention. At block 502, available devices within the local environment are determined by the apparatus 50, such as the processor 70, the device participation module 78 or the like. For example, it may be determined that a computer, television, and/or a gaming system are available in the environment.

At block 504, indications of user interactions with one or more devices are received, such as by the processor 70, the device participation module 78 or the like. The user, for example, may interact with several devices such as tangible interfaces, device user interfaces, application data and/or the like. Such interactions are monitored in order to develop a profile for the user which indicates, among other things, which devices the user desires to use in certain contexts.

At block 506, the user profile is created or updated, such as by the processor 70, based on the user interactions. The user interactions may reinforce previous the previous profile or may cause a change in the profile. The profile is then provided for use by the profile recommendation module 80 as shown with respect to FIG. 3. The method ends at the conclusion of block 506.

In an example embodiment, an apparatus for performing the method of FIGS. 4 and 5 and other methods described above may comprise a processor (for example, the processor 70) configured to perform some or each of the operations (402-406 and 502-506) described above. The processor may, for example, be configured to perform the operations (402-406 and 502-506) by performing hardware implemented logical functions, executing stored instructions, or executing algorithms for performing each of the operations. Alternatively, the apparatus may comprise means for performing each of the operations described above. In this regard and as described in more detail below, according to an example embodiment, examples of means for performing operations (402-406 and 502-506) may comprise, for example, the processor 70, the user interface 72, the communication interface 74, the device participation module 78, the profile recommendation module 80, and the session controller 82, as described above. However, the above-described portions of the apparatus 50 as they relate to the operations of the method illustrated in FIGS. 4 and 5 are merely examples, and it should be understood that various other embodiments may be possible.

Additionally, the operation 402 of determining at least one device within a local environment that is to interact with content on a device may be conducted by means, such as the user interface 72, the communication interface 74, and/or the processor 70. Additionally, the operation 404 of identifying a selected device may be conducted by means, such as session manager 82, and/or the processor 70. Also, the operation 406 of transferring the content may be conducted by means, such as session manager 82, the communication interface 74, and/or the processor 70.

Additionally, the operation 502 of determining available devices may be conducted by means, such as the user interface 72, the communication interface 74, the device participation module 78, and/or the processor 70. Additionally, the operation 504 of receiving indications of user interactions may be conducted by means, such as session manager 82, the device participation module 78, and/or the processor 70. Also, the operation 506 of updating a user profile may be conducted by means, such as profile recommendation module 80, the communication interface 74, and/or the processor 70.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to:
   cause a plurality of local devices to be discovered in response to a user interaction with an executable, wherein the plurality of local devices are configured to provide functionality related to the user interaction with the executable and each of the plurality of local devices is defined by at least one functional definition;
   select a local device from among the discovered plurality of local devices based on a user profile, the at least one functional definition of the local device and the user interaction with the executable, wherein the user profile indicates a preferred local device based on a set of functionality preferences and the at least one functional definition of the local device; and
   cause at least a portion of the functionality related to the executable to be transferred to the selected local device, wherein at least a portion of the functionality related to the executable is performed by the apparatus in an instance in which less than all of the functionality related to the executable is transferred to the selected local device.

2. The apparatus of claim 1, wherein the processor is further configured to:
   receive indications of user interactions with the plurality of local devices; and
   update the user profile based on the received indications of user interactions.

3. The apparatus of claim 2, wherein the user profile further comprises an indication of one or more preferred devices of the plurality of local devices and user privacy preferences.

4. The apparatus of claim 1, wherein the functionality related to the executable includes at least one of content and a program that is to be processed.

5. The apparatus of claim 1, wherein at least a portion of the functionality related to the executable is transferred to at least two selected local devices.

6. The apparatus of claim 1, further comprises:
   a device participation module configured, when executed by the processor, to discover local devices; and
   a session controller configured, when executed by the processor, to provide definitions regarding at least a portion of the functionality related to the executable being transferred to the selected local device.

7. The apparatus of claim 6, wherein the session controller is further configured to provide semantic session types.

8. A method comprising:
   locating at least one device within a local environment in response to an interaction with content, wherein the at least one device within a local environment is configured to provide functionality related to the interaction with the content, wherein each of the at least one local device is defined by at least one functional definition;
   identifying, using a processor, a selected device from the located at least one device based on a user profile recommendation, the at least one functional definition of the local device and the interaction with the content, wherein the user profile indicates a preferred local device based on a set of functionality preferences and the at least one functional definition of the local device; and
   causing at least one of the content and an executable to be transferred to the identified selected device, wherein at least one of the content and the executable is retained in an instance in which only one of the content or the executable is transferred to the identified selected device.

9. The method of claim 8, further comprising:
   receiving indications of user interactions with the at least one device; and
   updating the user profile based on the received indications of user interactions.

10. The method of claim 9, wherein the user profile further comprises an indication of one or more preferred devices of the at least one device within the local environment and user privacy preferences.

11. The method of claim 8, wherein the functionality related to the content further includes a program that is to be processed.

12. The method of claim 8, wherein at least a portion of the functionality related to the executable is transferred to at least two selected local devices.

13. The method of claim 8, further comprising:
discovering local devices; and
causing definitions to be provided regarding at least a portion of the functionality related to the content being transferred to the selected local device.

14. The method of claim 13, wherein the provided definitions are further configured to provide semantic session type definitions.

15. A computer program product comprising at least one computer readable non-transitory memory medium having program code stored thereon, the program code which when executed by an apparatus cause the apparatus at least to:
receive an identification of available devices in response to a user interaction with an executable, wherein available devices are configured to provide functionality related to the user interaction with the executable and each of the available devices is defined by at least one functional definition;
select a local device from the received identification of available devices based on a user profile, the at least one functional definition of the local device and the user interaction with the executable, wherein the user profile indicates a preferred local device based on a set of functionality preferences and the at least one functional definition of the local device; and
cause at least a portion of the functionality related to the executable to be transmitted to the selected local device, wherein at least a portion of the functionality related to the executable is performed by the apparatus in an instance in which less than all of the functionality related to the executable is transferred to the selected local device.

16. The computer program product of claim 15, further comprising program code instructions to:
receive indications of user interactions with the plurality of available devices; and
update the user profile based on the received indications of user interactions.

17. The computer program product of claim 16, wherein the user profile further comprises an indication of one or more preferred devices of the available devices and user privacy preferences.

18. The computer program product of claim 15, wherein the functionality related to the executable includes at least one of content and a program that is to be processed.

19. The computer program product of claim 15, wherein at least a portion of the functionality related to the executable is transferred to at least two selected local devices.

20. The computer program product of claim 15, further comprising program code instructions to:
discover local devices; and
provide definitions regarding at least a portion of the functionality related to the executable being transferred to the selected local device.

\* \* \* \* \*